Dec. 23, 1969 J. T. VOORHEIS 3,485,369
AUTOMATIC SELF-CLEANING LIQUID STRAINING SYSTEM
Filed April 30, 1968 5 Sheets-Sheet 1

INVENTOR.
JAMES T. VOORHEIS
BY
Angelo M. Pisarra
ATTORNEY

Dec. 23, 1969  J. T. VOORHEIS  3,485,369
AUTOMATIC SELF-CLEANING LIQUID STRAINING SYSTEM
Filed April 30, 1968  5 Sheets-Sheet 3

INVENTOR.
JAMES T. VOORHEIS
BY
Angelo M. Pisarra
ATTORNEY

Dec. 23, 1969　　　J. T. VOORHEIS　　　3,485,369
AUTOMATIC SELF-CLEANING LIQUID STRAINING SYSTEM
Filed April 30, 1968　　　　　　　　　　　5 Sheets-Sheet 4

INVENTOR.
JAMES T. VOORHEIS
BY
*Angelo M. Pisarra*
ATTORNEY

Dec. 23, 1969   J. T. VOORHEIS   3,485,369
AUTOMATIC SELF-CLEANING LIQUID STRAINING SYSTEM
Filed April 30, 1968   5 Sheets-Sheet 5

INVENTOR
JAMES T. VOORHEIS
BY
ATTORNEY

United States Patent Office 3,485,369
Patented Dec. 23, 1969

3,485,369
AUTOMATIC SELF-CLEANING LIQUID
STRAINING SYSTEM
James T. Voorheis, Essex Fells, N.J., assignor to Coen
Manufacturing Corporation of New Jersey, Caldwell,
N.J., a corporation of New York
Filed Apr. 30, 1968, Ser. No. 725,459
Int. Cl. B01d 29/39
U.S. Cl. 210—108                                    8 Claims

ABSTRACT OF THE DISCLOSURE

Automatic system for straining a liquid and for cleaning the strainers of said system which comprises a reservoir for the liquid, a first, second and third strainer, a receiver for receiving strained liquid and an inlet therefor, a first and a second reversible positive displacement pump, means for driving one of the pumps clockwise to transmit the liquid from the reservoir through the first strainer to strain same, then through the first pump and to said inlet from which a portion of the liquid passes through outlet means and into the receiver and another portion thereof passes through the third strainer to back-flush it and thereby clean it and then passes into the reservoir, means responsive to liquid pressure differential across the first strainer, due to clogging of same by the foreign matter strained out by it, for driving the second pump clockwise to transmit liquid from the reservoir through the second strainer to strain same, then through the second pump and to said inlet from which a portion of the total liquid being fed by both pumps into said inlet passes through the outlet means and another portion thereof passes through the third strainer to back-flush it and then into the reservoir. The cycle is continued until all filters have been in use and then cleaned. The entire cycle is then continuously repeated.

BACKGROUND OF THE INVENTION

To date most positive displacement pumps used in liquid straining systems are protected with either a duplex strainer in the suction line common to both pumps or a simplex strainer before each pump. When the duplex strainer is used, it is necessary manually to move the mechanism from one side to another and also manually to clean the basket taken from the side not in service. When the simplex strainers are used, it has been necessary manually to switch from one pump to the other and then to manually clean the basket of the strainer serving the pump not in service.

Motor driven stacked plate type strainers have been used in automatic service but these are best suited when system economy is of secondary consideration and being motor driven puts them in the moving machinery class.

The prior systems in which either duplex or simplex strainers have been employed have the following disadvantages well known to those skilled in the art, manual attendance is required; human error-operators have inadvertently opened the side of the duplex strainer in service or the simplex strainer in service which can shut down systems when strainers are in vacuum service or cause flooding or accidents if the strainers are in pressure service.

SUMMARY OF THE INVENTION

The system of the present invention does not require the use of the expensive motor driven stack plate strainers and indeed functions to effectively protect the pumps when three strainers of the conventional or simplex type are used together with the other parts in certain relationship one to the other. In addition the system of this invention may be in operation for very long periods of time to maintain liquid discharging from an outlet into a receiver continuously and at a substantially constant rate, without requiring manual attendance because one of the strainers therein is being back flushed for at least part of the period that another strainer is acting to strain liquid on its way to the pump in service in the course of feeding the liquid from the reservoir to the outlet.

The automatic self cleaning liquid straining system of this invention comprises a reservoir for containing a supply of liquid; a receiver having an inlet for receiving the liquid and outlet through which is discharged the liquid fed into the inlet; first means for transmitting liquid from the reservoir to said receiver and comprising a pair of second means, each communicating at one end with the reservoir and its other end with the inlet and including a strainer and a reversible positive displacement pump, the reservoir, strainer, pump and inlet being series-connected in that order; third means establishing communication between the reservoir and the inlet and including another strainer and pressure regulating means, the inlet, pressure regulating means, other strainer and the reservoir being series connected in that order; the reservoir, other strainer, the pump and strainer of one of the second means and said reservoir being series-connected in that order to permit liquid flow from and back to said reservoir; the reservoir, other strainer, the pump and strainer of the other of said second means and said reservoir being series-connected in that order to permit liquid flow from and back to said reservoir; each of the pumps being in communication with the inlet; the inlet being in communicaton with the pressure regulating means permitting the passage of a portion of the liquid through the inlet and out of the outlet means into the receiver and another portion thereof through the pressure regulating means when the liquid under pressure is transmitted to said inlet by either one or both of said pumps; the other strainer being in service when either one or both of the pumps are in service and fourth means for controlling actuation of each pump and the direction of liquid flow therethrough, said fourth means including a pair of fifth means each of which is responsive to a predetermined liquid pressure differential across a corresponding strainer of the second means.

BRIEF DESCRIPTION OF THE DRAWINGS

FIG. 3 is a view between A—A, B—B, C—C and D—D of FIG. 1, and shows diagrammatically the initial stage of liquid flow in the system: a first pump in operation and driven clockwise.

FIG. 4 is a view similar to FIG. 3 and shows diagrammatically the second and fifth stages of liquid flow in the system: both pumps in operation and driven clockwise.

DESCRIPTION OF THE PREFERRED EMBODIMENT

Figure 1:
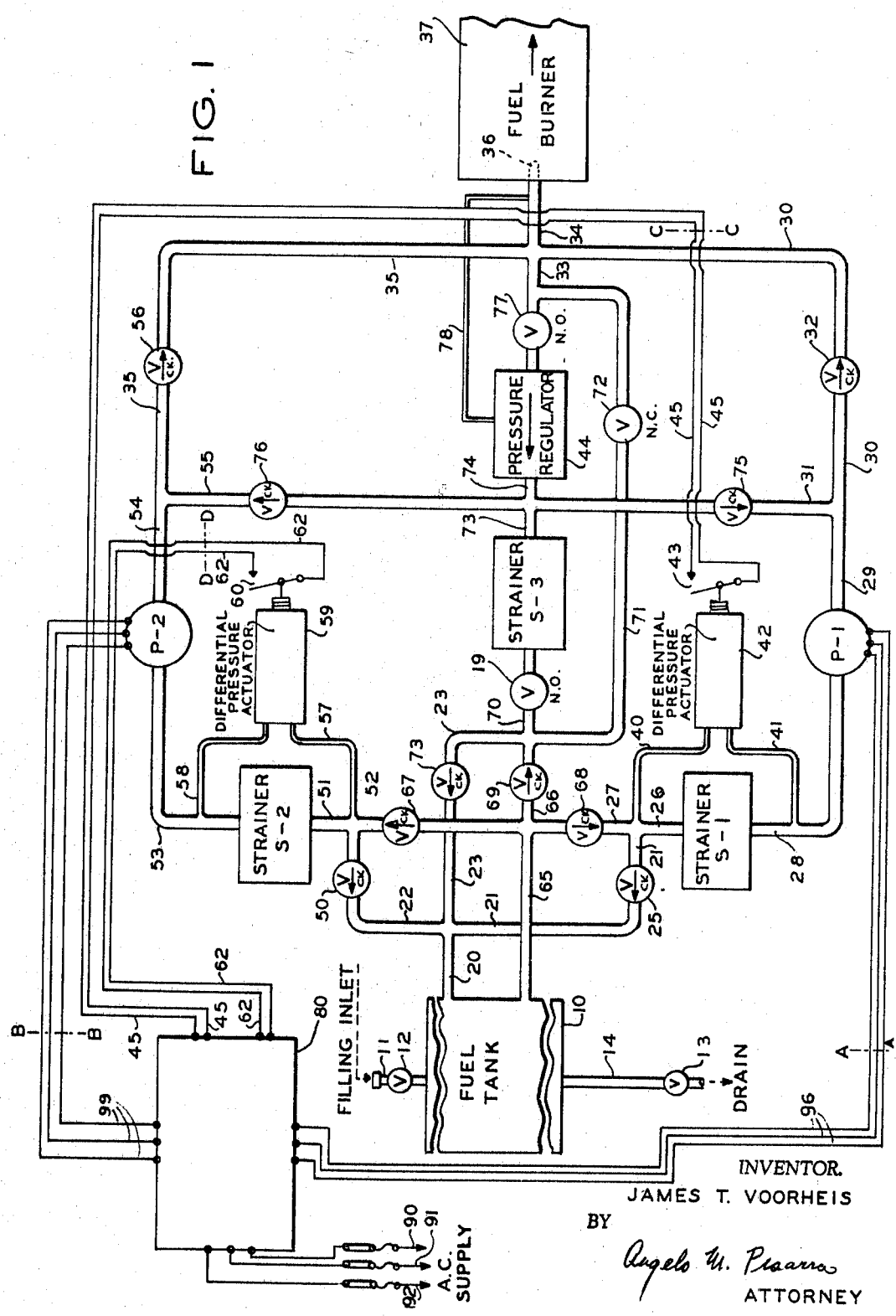
FIG. 1 is a schematic representation of a system embodying the invention.

Referring to FIG. 1, there is shown liquid fuel tank 10 containing a supply of liquid fuel therein. A liquid fuel-inlet tube 11 with a valve 12 therein is in communication with tank 10 and extends upwardly from the top thereof for admitting liquid fuel to tank 10 as it is required. Depending from the bottom of tank 10 and having a normally closed valve 13 therein is an outlet tube 14 for draining out of the bottom of tank 10 at various times foreign matter which settled in tank 10 during the operation of the apparatus of this invention.

A fuel pipe line 20 extends from a side of tank 10 and is in communication therewith at a level above or below the liquid fuel therein. Pipe line 20 extends from tank 10 and then branches off into three individual pipe lines 21, 22 and 23. A stop check valve 25 is in line 21 and line 21 beyond valve 25 branches off into two individual pipe lines 26 and 27. Pipe 26 is coupled with one side of a conventional simplex strainer S–1. A pipe line 28 is coupled with the other side of strainer S–1 and with one side of a reversible electric drive motor positive displacement pump P–1. A pipe line 29 is coupled with the other side of pump P–1 and then branches off into two pipes 30 and 31. Pipe 30 branches off into three individual pipe lines 33, 34 and 35. A discharge nozzle or outlet 36 for the passage of the liquid fuel to be burned is located in a fuel burner or receiver 37 and is coupled with the receiver inlet pipe 34. A pair of thin fluid pressure sensing lines 40 and 41 are respectively in communication with pipes 26 and 28 and are part of a differential pressure actuator 42 associated with a normally open switch 43 associated with electrical conductors 45. Actuator 42 is capable of closing the switch when the pressure differential between the fuel in lines 26 and 28 reaches a predetermined value and opening the switch when said differential pressure is at a value less than said predetermined value.

The pipe line 22 has a stop check valve 50 therein and therebeyond branches off into a pair of individual pipe lines 51 and 52. Pipe line 51 is coupled with one side of a conventional simplex strainer S–2 which is like S–1. A pipe line 53 is coupled with the other side of strainer S–2 and one side of pump P–2 which is like P–1. A pipe line 54 is coupled with the other side of pump P–2 and then branches off into two individual pipe lines: pipe line 55 and the pipe line 35 which has a stop check valve 56 therein. A pair of thin fuel pressure sensing lines 57 and 58 are respectively in communication with the pipes 51 and 53 and are part of a differential pressure actuator 59 associated with a normally open switch 60 associated with electrical conductor 62. Actuator 59 is capable of closing switch 60 when the pressure differential between the fuel in lines 51 and 53 reaches a predetermined value and opening the switch 60 when said pressure differential is below that value.

A pipe line 65 is secured to a side of tank 10 and is in communication therewith at a level considerably above the bottom thereof and preferably at least as high as the mid-height thereof and appreciably below the level at which pipe line 20 is in communication with tank 10. Pipe line 65 extends from tank 10 and then branches off into three individual pipe lines: pipe line 66, and the pipe line 52 having a stop check valve 67 therein and the pipe line 27 having a stop check valve 68 therein. Pipe line 66 has a check valve 69 therein and therebeyond branches off into three individual pipe lines: pipe line 70, a service pipe line 71 having a manually operable normally closed valve 72 therein, and the pipe line 23 having a stop check valve 73 therein.

Pipe line 70 has a manually operable normally open service valve 19 therein and therebeyond is coupled with one side of a conventional simplex strainer S–3 which is like strainers S–1 and S–2. A pipe line 73 is coupled with the other side of strainer S–3, extends therefrom and then branches into three individual branch pipe lines: pipe line 74 coupled to one side of a pressure regulator or pressure regulating valve 44; the pipe 31 having a stop check valve 75 therein; and the pipe 55 having a stop check valve 76 therein. The pipeline 33 has a manually operable normally open service valve 77 therein and is coupled with the other side of the pressure regulator 44. Pipe line 71 is in communication with pipe line 33 at a position between valve 77 and the location where lines 30 and 35 meet with the receiver inlet 34. A relatively thin fluid sensing line 78 is in communication with the inlet 34 and the pressure regulator 44 is thereby controlled by the fluid pressure in inlet 34 whereby a constant flow of liquid fuel through the outlet or nozzle 36 is continuously maintained and continuous flow of liquid fuel is continuously maintained from inlet 34 through regulator 44.

The operation of the beforedescribed system is controlled by means including a control panel 80. And that means is shown schematically or in block representation in FIG. 2.

Figure 2:
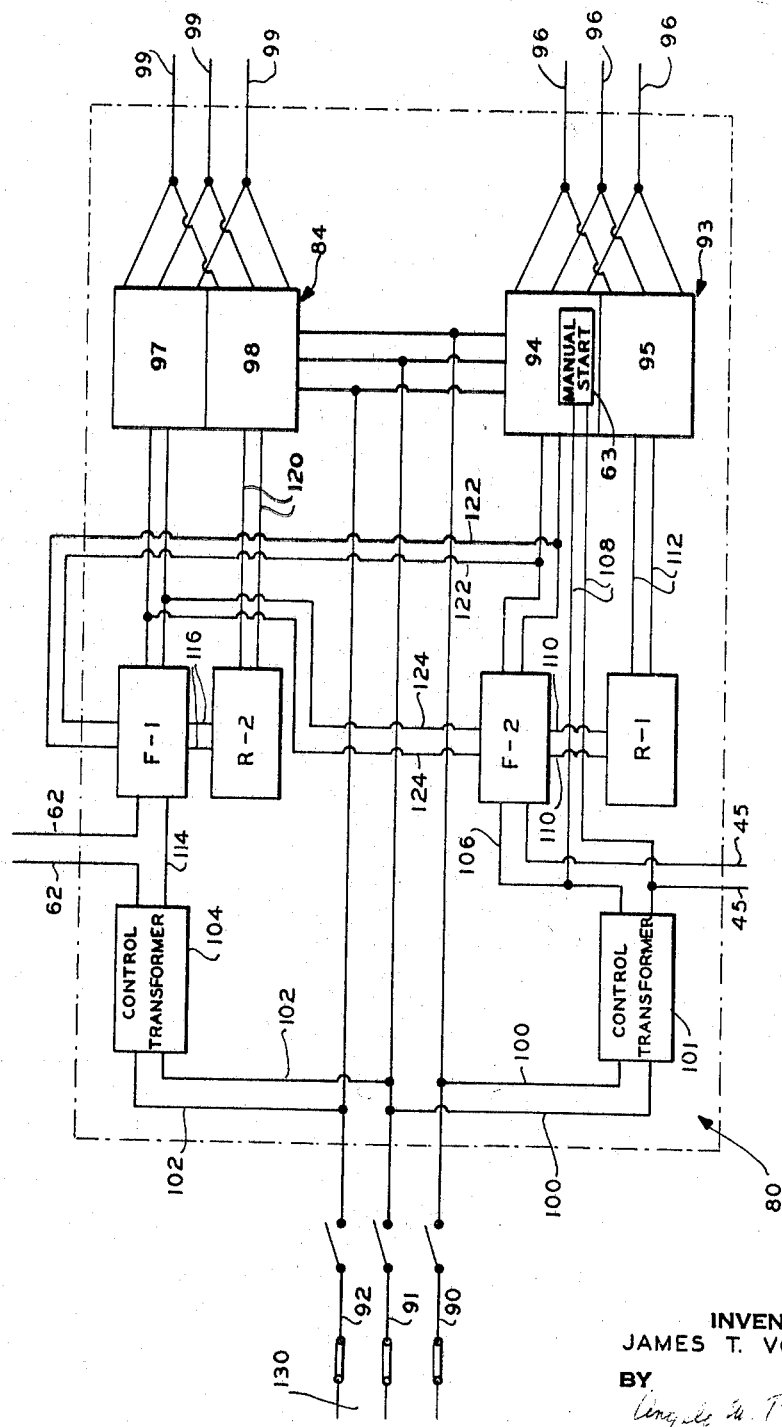
FIG. 2 is a block representation of the control panel of FIG. 1.

Referring to FIG. 2, there is a three phase electric source of supply electrically connected through electrical conductors 90, 91 and 92 to a pair of motor controllers 93 and 84. Controller 93 comprises a forward motor control 94 and a reverse motor control 95, both of which are electrically connected to the reversible electric motor of pump P–1 by electrical conductors 96; and controller 84 comprises a forward motor control 97 and a reverse motor control 98, both of which are connected to the reversible electric motor of pump P–2 by electrical conductors 99. A pair of electrical conductors 100 are connected to conductors 90 and 91 and to the input terminals of a control transformer 101; and a pair of electrical conductors 102 are connected to conductors 91 and 92 and to the input terminals of a control transformer 104. The electrical conductors 45 connected through the movable contact of switch 43 are connected from an output terminal of transformer 101 and electrical conductor 106 is connected to the other output terminal of transformer 101 and both sides to a timer-controller F–2. A pair of electrical conductors 108 are connected to a "manual start" or push button station for the forward control 94 and also to the output terminals of transformer 101. A timer-controller R–1 is electrically connected to timer-controller F–2 by conductors 110 and to the motor reversing controller 95 by conductors 112.

The electrical conductors 62 connected through the movable contact of switch 60 are connected from an output terminal of transformer 104 and an electrical conductor 114 is connected to the other output terminal of transformer 104 and both sides to a timer-controller F–1 which is similar to F–2. A pair of electrical conductors 116 connect a timer-controller R–2, which is similar to R–1, with the timer-controller F–2. A pair of electrical conductors 120 are connected to timer-controller R–2 and the motor reversing controller 98. A pair of electrical conductors 122 connect the timer-controller F–1 and the forward motor controller 94. A pair of electrical conductors 124 connect timer-controller F–2 and forward motor controller 97.

The operation of the apparatus is as follows:

Each of the "forward" timer-controllers F–1 and F–2 is pre-set for an appropriate short period of timing operation which may be 2 or more minutes and each of the "reverse" timer-controllers R–1 and R–2 is set for an appropriate relatively longer period of timing operation, which may be 20, 30 or more minutes. The tank 10 contains the liquid fuel to be strained and which substantially completely fills tank 10. The 3 phase electrical circuit is made by actuating the "manual start" 63. Thereupon none of the four timer-controllers is in operation and only the forward starter 94 of the motor controller 93 is energized whereby the motor of the positive displacement pump P–1 is driven forward thereby to drive the pump P–1 as shown by the arcuate arrow therein (FIG.

3) and pump P–1 continues to so operate at substantially constant speed to provide and maintain negative pressure between one side of the pump P–1 and tank 10 and positive pressure between the other side of the pump and the inlet 34. The pump P–1 causes and maintains the flow of fuel from tank 10 through pipe 65, valve 68, pipes 27, 26, strainer S–1 to strain or filter out foreign matter, then through pipe 28, pump P–1, pipe 29, pipe 30 and valve 32, inlet 34 and nozzle 36, with that flow of the fuel being in the direction of the external arrows and through the fuel filled pipes as shown in thick heavy black line in FIG. 3. The fuel also fills the pressure sensing lines 40 and 41 of the actuator 42 also as shown in FIG. 3.

The pump P–1 is of appropriate and such rating as to deliver to the pipe 34 and nozzle 36 strained liquid at such pressure considerably in excess of the liquid pressure which is to be maintained at the nozzle 36. This liquid pressure at the nozzle 36 is maintained substantially constant by the pressure regulating valve 44 automatically controlled by the pressure of liquid in inlet 34 through the pressure sensing line. 78. Consequently, the pump P–1 delivers liquid into inlet 34 at a rate considerably in excess of that which passes through nozzle 36 to maintain continuously a flow of said liquid at a constant rate through nozzle 36 and the excess which is appreciable is continuously maintained and is diverted through the pressure regulator 44. This excess strained fluid in this operation flows through pipe 33 and valve 77, also as shown in thick heavy black line in FIG. 3, and into and through the pressure regulator valve and then therefrom a shown in dash lines in FIG. 3 through pipes 74, 73, strainer S–3 to flush S–3, then through pipe 70 and valve 19, pipe 23 and valve 73, pipe 20 and into the upper end of the tank 10 thereby to back flush strainer S–3. The pressure regulator valve in this and subsequent operations is controlled by the pressure of the liquid in inlet 34 through the pressure sensing line 78.

After a number of hours which may be 6, 8 or more hours of continuous operation as before described and shown diagrammatically in FIG. 3, and depending upon the proportion of strainable foreign matter in the liquid fuel fed into strainer S–1, strainer S–1 becomes sufficiently clogged as to require cleaning. When this occurs the pressure differential between the fuel at the inlet and the outlet sides of the strainer S–1 and consequently in the pressure sensing lines 40 and 41 of the switch actuator 42 causes the switch 43 to be closed whereupon timer-controller F–2 is energized and is brought in service or caused to operate. Thereupon the forward starter 97 of the motor controller is energized whereby the motor of the pump P–2 is driven forward thereby to so driven pump P–2 as shown by the arcuate arrow therein (FIG. 4) and continues to so operate at substantially the same capacity as the still operating pump P–1 so that now as shown in FIG. 4 both pumps P–1 and P–2 are pumping forward so that the liquid fuel flow shown in FIG. 3 is maintained and simultaneously pump P–2 causes liquid fuel from tank 10 to be drawn out of tank 10 through now common pipe 65, pipe 52 and valve 67, pipe 51, strainer S–2 to strain or filter out foreign solid matter, then through pipe 53, pump P–2 and then forced through pipes 54, pipe 35 and valve 56, inlet 34, and the nozzle 36 of the burner. The excess liquid fuel under pressure delivered to inlet 34 and the pressure thereof therein by the action of both pumps P–1 and P–2 are greater than those in the FIG. 3 operation and are continuously maintained and like before the excess fluid is diverted through the common pipe 33 and valve 77 into and through the pressure regulator and as shown in dash lines into and through pipes 74, 73, strainer S–3 to back flush it through pipe 70 and valve 19, pipe 23 and valve 73, and pipe 20 back to the tank 10. The aforedescribed condition as shown in FIG. 4 is maintained preferably for a relatively short period of time, generally a number of minutes, that is 2, 3 or more minutes, the time for which the timer-controller F–2 was pre-set, to assure the completely uninterupted maintenance of the desired liquid flow out of the nozzle and back flushing through strainer S–3.

Figure 5:
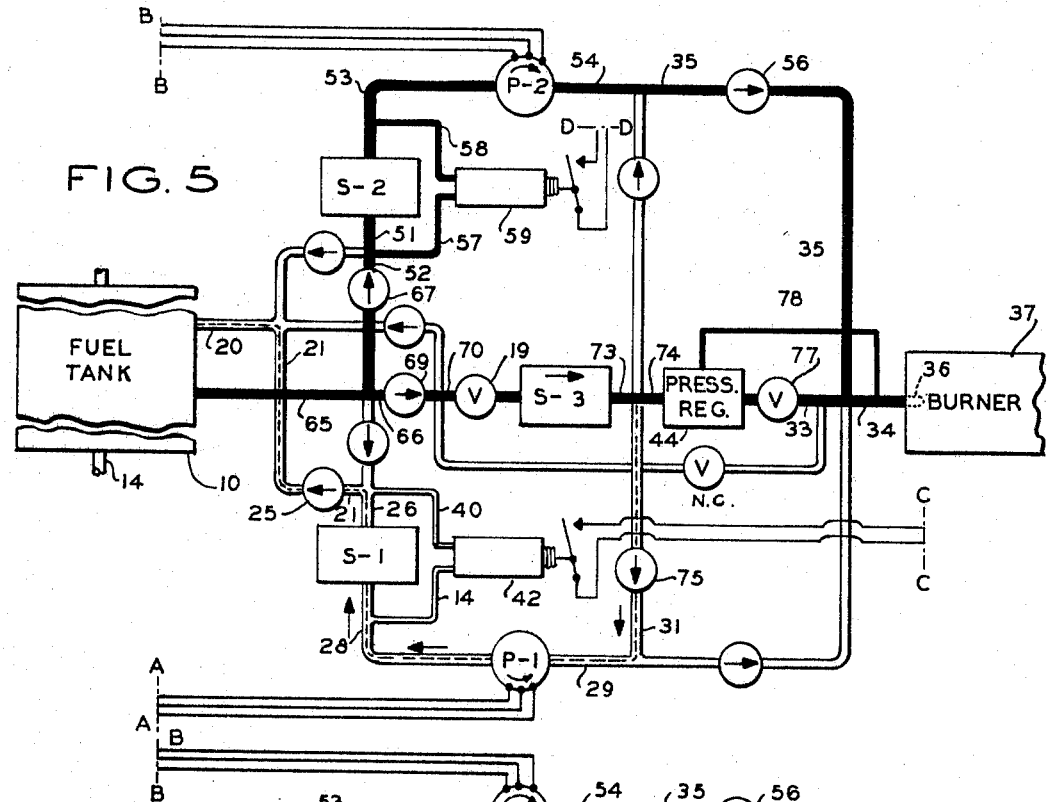
FIG. 5 is a view similar to FIG. 3 and shows diagrammatically the third stage of liquid flow in the system: the first pump in operation and now driven counter-clockwise and the second pump still is in operation, still driven clockwise.

At the end of that period, the timer of F–2 runs out whereupon the forward controller 94 becomes de-energized whereupon the motor drive for pump P–1 is stopped and P–1 ceases operating and simultaneously the reverse timer controller R–1 is brought into service or operation to cause the reversing controller 95 of the motor drive of pump P–1 to be so energized as to cause that drive and pump P–1 to be driven in the reverse direction as shown by the arcuate arrow therein (FIG. 5). Thereupon the switch 43 is automatically opened and as shown in FIG. 5, both pumps P–1 and P–2 are still operating, but are rotating in opposite directions whereupon the condition shown in FIG. 5 is established and maintained. As shown therein, pump P–2 still maintains the flow of fuel into and through both the nozzle and the pressure regulator and along the path as hereinbefore described as shown in FIG. 4 and pump P–1 causes and maintains flow of fuel from the tank 10, through pipe 65, pipe 66 and valve 69, pipe 70 and valve 19, strainer S–3 to strain out foreign matter from the fuel, and pipe 73. Fuel from pipe 73 meets excess fuel traveling in the opposite direction from the pressure regulator as shown also in the thick heavy black line of FIG. 5. Pump P–1 draws the merged fuel as shown in dash lines through pipe 31 and valve 75, pipe 29 and into pump P–1, and then is forced by pump P–1 through pipe 28, strainer S–1, pipe 26, pipe 21, valve 25, pipe 20 and into the tank 10. The forcing of the fuel through strainer S–1 flushes the previously clogged strainer S–1 with fuel strained by S–2 and S–3 thereby to remove the foreign material collected on S–1 whereby the same is cleaned. And after the flushing, the flushing fuel which is heavily laden with the previously strained out foreign matter which has become agglomerated reaches the tank 10. Most of such foreign matter so returned to tank 10 drops to the bottom thereof. The aforesaid condition as shown in FIG. 5 is maintained for a number of minutes depending upon the time for which the timer-controller R–1 was pre-set and generally being 20, 30 or more minutes to assure adequate flushing for cleansing of the strainer S–1. At the end of that time, the timer of R–1 runs out thereby causing the motor controller 93 to become completely de-energized whereupon the pump P–1 stops.

At this stage with pump P–1 stopped or out of service and pump P–2 still operating as before described, the condition shown in FIG. 6 is effectuated again without any interruption in the continuous supply of fuel to the inlet 34, nozzle 36 and pressure regulator 44. Pump P–2 continues to maintain the flow of fuel as shown in thick heavy black line from tank 10, through pipe 65, pipe 52 and valve 67, pipe 51 strainer S–2 to strain the fuel, pipe 53, pump P–2, pipe 54, pipe 35 and valve 56, inlet 34, and nozzle 36 and the excess in inlet 34 is diverted continuously into and through the pressure regulator and as shown in dash lines, the excess continuously flowing out of the pressure regulator flows through pipes 74, 73, strainer S–3 to flush and thereby clean it, through pipe 70 and valve 19, pipe 23 and valve 73, and pipe 20 to the tank 10. The foreign solid matter returned to the tank 10 in the flushing fluid drops to the bottom of the tank.

Figure 6:
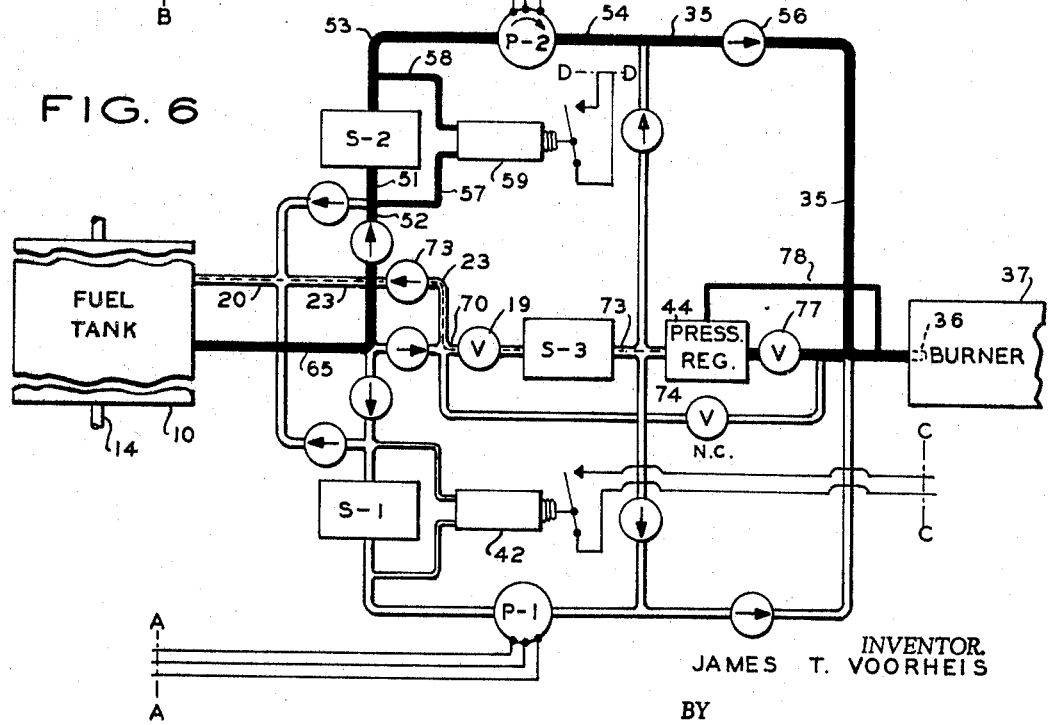
FIG. 6 is a view similar to FIG. 3 and shows diagrammatically the fourth stage of liquid flow in the system: the second pump only in operation and still driven clockwise.

The aforesaid condition as shown in FIG. 6 is continuously maintained for 6, 8 or more hours and until the strainer S–2 becomes sufficiently clogged as to require cleaning. When that occurs, the pressure differential between outlet and inlet sides of strainer S–2 and consequently between the fuel in the pressure sensing lines 57, 58 of the switch actuator 59 causes the switch 60 to be closed whereupon the timer-controller F–1 becomes energized and brought into service or operation. Thereupon the forward starter 94 of motor controller 93 is energized whereby the motor of pump P–1 and pump P–1 are driven forward as shown by arcuate arrow therein so that the condition as aforedescribed with respect to FIG. 4 and shown in FIG. 4 except that switch 43 is open and switch 60 is closed, is effectuated.

Figure 7:
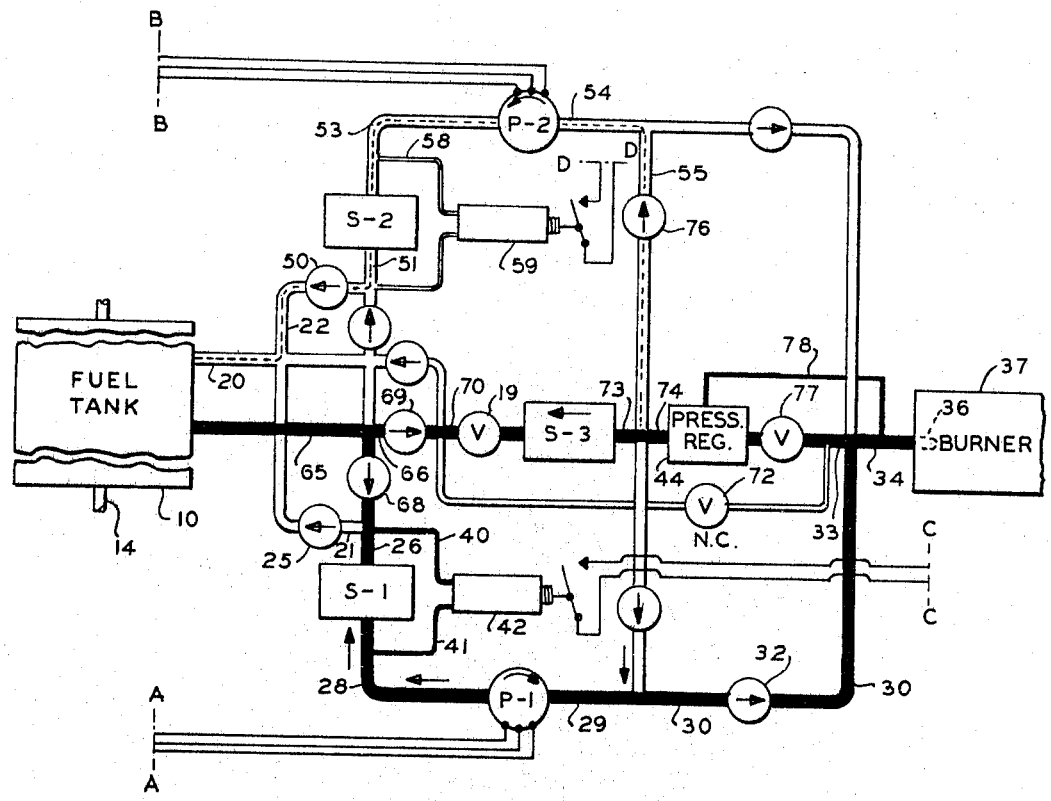
FIG. 7 is a view similar to FIG. 5 and shows diagrammatically the sixth stage of liquid flow in the system: the second pump in operation and now driven counter-clockwise and the first pump still in operation, still driven clockwise.

The aforedescribed condition as shown in FIG. 4 is again maintained preferably for a relatively short period of time, generally a number of minutes, that is 2, 3 or more minutes, the time for which the time-controller F–1 was preset, to assure the completely uninterrupted maintenance of the desired fuel flow out of the nozzle and flushing through strainer S–3 to clean same. At the end of that period, the timer of F–1 runs out thereby causing the forward controller 97 to become de-energized whereupon the motor drive for pump P–2 is stopped and simultaneously the reverse timer-controller R–2 is brought into service or operation to cause the reversing controller 98 of the motor drive of pump P–2 to be energized or brought into service as to cause that drive and pump P–2 to be driven in the reverse direction as shown by the arcuate arrow therein (FIG. 7). Thereupon the switch 60 is automatically opened and as shown in FIG. 7, both pumps P–1 and P–2 are still operating, but are rotating in opposite directions whereupon the condition shown diagrammatically in FIG. 7 is established and maintained. As shown therein, pump P–1 still maintains the flow of fuel into and through both the nozzle and the pressure regulator and along the path as shown in FIG. 3 and pump P–2 causes and maintains flow of fuel from the tank 10, through pipe 65, pipe 66 and valve 69, pipe 70 and valve 19, strainer S–3 to strain out solid foreign matter, and pipe 73. Fuel flowing out of pipe 73 meets excess fuel from the pressure regulator as shown in the thick heavy black lines of FIG. 7. Pump P–2 draws the merged fuel as shown in dash lines through pipe 55 and valve 76, pipe 54 and into pump P–2, and then is forced by pump P–2 through pipe 53, strainer S–2, pipe 51, pipe 22 and valve 50, pipe 20 and into the tank 10. The forcing of the fuel through strainer S–2 flushes the previously clogged strainer thereby to remove the foreign material collected thereon whereby the same is cleaned. And after the flushing, the flushing fluid now heavily laden with the previously strained out foreign matter, which has become agglomerated, reaches the tank 10, most of such foreign matter drops to the bottom of the tank. The aforesaid condition as shown in FIG. 7 is maintained for a number of minutes depending upon the time for which the timer-controller R–2 was pre-set and generally being 20, 30 or more minutes to assure adequate back flushing for cleansing of the strainer S–2. At the end of that time, the timer of R–2 runs out thereby causing the motor controller 84 to become completely de-energized whereupon the pump P–2 stops.

At this stage with pump P–2 out of service and pumps P–1 still operating as before, the condition shown in FIG. 3 is effectuated, again without any interruption in the continuous supply of fuel to the nozzle. This cycle of operation is repeated many, many times whereby a flow of fuel out of nozzle 36 is continuously maintained for very long time. Should replacement of either strainers S–1 or S–2 be required, they may be respectively replaced at those stages when not in operation, and should replacement of strainer S–3 be required, this may be readily accomplished by appropriately controlling the service valves 19, 77 and 72 at any appropriate stage of operation.

All of the stop check valves in the system of this invention heretofore described permit the flow of liquid therethrough only in the respective directions shown by the respective arrows therein and prevent the flow of liquid therethrough in the opposite directions. The pressure regulator 4 permits the flow of liquid therethrough only in a direction from inlet 34 towards strainer S–3 and prevents the flow of liquid therethrough in the opposite direction.

Since certain changes may be made in the aforedescribed system and different embodiments of the invention could be made without departing from the scope thereof, it is intended that all matter contained in the above description or shown in the accompanying drawing shall be interpreted as illustrative and not in a limiting sense.

I claim:
1. An automatic self-cleaning liquid straining system comprising:
   a reservoir for containing a supply of liquid;
   a receiver having an inlet for receiving liquid;
   a first means for transmitting liquid from said reservoir to said receiver, said first means comprising a pair of second means, each second means communicating at one end with the reservoir and at its other end with said inlet and including a strainer and a reversible pump, said reservoir, strainer, pump and inlet being series-connected in that order;
   third means establishing communication between said reservoir and said inlet, said third means including another strainer and pressure regulating means, said inlet, pressure regulating means, other strainer and reservoir being series-connected in that order;
   said reservoir, other strainer, the pump and strainer of one of the second means and said reservoir being series-connected in that order to permit liquid flow from and back to said reservoir;
   said reservoir, other strainer, the pump and strainer of of the other of the second means and said reservoir being series-connected to permit liquid flow in that order from and back to the reservoir;
   said inlet being in communication with said pressure regulating means permitting the passage of a portion of the liquid into the receiver and another portion thereof through the pressure regulating means when the liquid under pressure is trransmitted to said inlet by either one or both of said pumps.

2. An automatic self-cleaning liquid straining system according to claim 1,
   each of the second means including also valve means between the pump of the second means and the inlet operable to permit liquid flow through the valve means from the reservoir to the inlet and to prevent liquid flow from the inlet through that pump to the reservoir;
   the pressure regulating means and the pump and strainer of one of the second means and the reservoir being series-connnected in the order to permit the flow of liquid from the pressure regulator to the reservoir;
   the pressure regulating means and the pump and strainer of the other of the second means and the reservoir being series-connected in that order to permit the flow of liquid from the pressure regulator to said reservoir.

3. A system according to claim 1 including fourth means for controlling actuation of each pump and the direction of liquid flow therethrough, said fourth means comprising a pair of fifth means each of which is responsive to a predetermined liquid pressure differential across a corresponding strainer of said second means.

4. A system according to claim 1, also comprising means for driving in one direction the pump of one of said second means thereby to transmit liquid through its strainer and to said inlet, for driving in said one direction, in response to a predetermined liquid pressure differential across the last-mentioned strainer, the pump of the other of said second means, thereby to transmit liquid through its strainer and to said inlet, for driving, in a reverse direction, upon termination of a predetermined time interval, the pump of said one of said second means, for ceasing operation of said pump of said one of said second means, upon termination of another predetermined time interval, for driving in said one direction, in response to a predetermined liquid pressure differential across the strainer of said other of said second means, the pump of said one of said second means to again transmit liquid through the strainer of said one of said second means to said inlet, for driving in a reverse direction, upon termination of a further predetermined time interval, the pump of said other second means, and for ceasing operation of said pump of said other of said second means upon termination of still another predetermined time interval.

5. A system according to claim 1, also comprising means for driving in one direction the pump of one of said second means thereby to transmit liquid through its strainer to strain the liquid and to said inlet and forcing a portion thereof through the inlet and another portion thereof from said inlet and through the pressure regulating means and other strainer to the reservoir, for driving in said one direction, in response to a predetermined liquid pressure differential across the strainer in said one of said second means, the pump of the other of said second means, thereby to transmit liquid through its strainer and to said inlet, while said pump of said one of said second means is still in service whereby both pumps are feeding liquid to the inlet and forcing a portion of it through the inlet and another portion through the pressure regulating means and other strainer to the reservoir, for driving, in a reverse direction, upon termination of a predetermined time interval, the pump of said one of said first means whereby liquid is also transmitted from said reservoir through said other strainer and then it together with the liquid flowing from the pressure regulating means, by the action of the still in service pump of the other of the second means, are transmitted through the strainer in the one of said second means to said reservoir, for ceasing operation of said pump of said one of said second means whereby only the pump of said other second means is in service, upon termination of another predetermined time interval, for driving in said one direction, in response to a predetermined liquid pressure differential across the strainer of said other of said second means, the previously stopped pump to again transmit liquid through its strainer to said inlet while said pump of said other of said second means is still in service whereby both pumps are feeding liquid to the inlet and forcing a portion of it through the inlet and another portion through the pressure regulating means and other strainer to the reservoir, for driving in a reverse direction, upon termination of another predetermined time interval, the pump of said other second means whereby liquid is again also transmitted from said reservoir through said other strainer and then it together with the liquid flowing from the pressure regulating means by the action of the still in service pump of the one of the second means, are transmitted through the strainer in the other of said second means to said reservoir, and for ceasing operation of said pump of said other of said second means upon termination of another predetermined time interval, whereby again only the pump of said one of said second means is in service.

6. An automatic self-cleaning liquid straining system according to claim 1, also comprising:
valve means, between the pumps and the inlet, operable to permit liquid flow therethrough from the pumps to the inlet and to prevent liquid flow therethrough in the reverse direction;
valve means, between the strainers of the first means and the reservoir, operable to permit liquid flow therethrough from the strainers of the first means to the reservoir and to prevent liquid flow therethrough in the reverse direction;
valve means, between the strainers of the first means and the reservoir, operable to permit liquid flow therethrough from the reservoir to the strainers of the first means and to prevent flow of liquid therethrough in the reverse direction;
valve means between the reservoir and the other strainer to permit liquid flow of liquid therethrough from the reservoir to the other strainer and to prevent liquid flow therethrough in the reverse direction;
valve means, between the pressure regulating means and the pumps, operable to permit liquid flow therethrough from the pressure regulating means and other strainer to the pumps and to prevent liquid flow therethrough in the reverse direction.

7. An automatic self-cleaning liquid straining system according to claim 6 and also comprising outlet means for the passage of liquid therethrough from the inlet into the receiver:
the pressure regulating means controlling the rate of liquid flow out of said outlet from said inlet by permitting liquid flow through the pressure regulating means therethrough from said inlet,
the last mentioned valve means connected to the pumps and also connected to that side of the pressure regulating means through which the liquid from the inlet is discharged from said pressure regulating means.

8. An automatic self-cleaning liquid straining system according to claim 1, also comprising:
first valve means, between the pressure regulating means and the pump of the one of the second means, operable to permit liquid flow through the first valve means from said pressure regulating means to the pump to the one of the second means and to prevent liquid flow therethrough in the reverse direction;
second valve means, between the strainer of the one of the second means and the reservoir, operable to permit flow of liquid through the second valve means from the strainer of the one of said second means to said reservoir and to prevent flow of liquid therethrough in the reverse direction;
the inlet, pressure regulating means, first valve means, pump and strainer of the one of said second means, second valve means and reservoir being series-connected in that order;
third valve means, between the pressure regulating means and the pump of the other of the second means, operable to permit liquid flow through the third valve means from the pressure regulating means to the pump of the other of the second means and to prevent liquid flow therethrough in the reverse direction;
fourth valve means, between the strainer of the other of the second means and the reservoir, operable to permit liquid flow through the fourth valve means from the strainer of the other of the second means to the reservoir and to prevent liquid flow therethrough in the reverse direction;
the inlet, pressure regulating means, third valve means, pump and strainer of the other second means, fourth valve means and reservoir being in series-connected in that order;
fifth valve means, between the reservoir and the strainer of the one of the second means, operable to permit liquid flow through the fifth valve means from the reservoir to the strainer of the one of the second means and to prevent liquid flow therethrough in the reverse direction;
sixth valve means, between the pump of the one of the second means, and the inlet operable to permit liquid flow through the sixth valve means from the pump of the one of the second means to the inlet and to prevent liquid flow therethrough in the reverse direction;
the reservoir, fifth valve means, strainer and pump of the one of the second means, sixth valve means and inlet being series-connected in that order;
seventh valve means, between the reservoir and the strainer of the other of the second means, operable to permit liquid flow through the seventh valve means from the reservoir to the strainer of the other of the second means and to prevent liquid flow therethrough in the reverse direction;

eighth valve means, between the pump of the second means and the inlet operable to permit liquid flow through the eighth valve means from the pump of the second means to said inlet and to prevent liquid flow therethrough in the reverse direction;

the reservoir, seventh valve means, strainer and pump of the second means, eighth valve means and inlet being series-connected in that order;

ninth valve means, between the reservoir and the other strainer, operable to permit liquid flow through the ninth valve means from the reservoir to the other strainer and to prevent liquid flow therethrough in the reverse direction;

the reservoir, ninth valve means, other strainer and first valve means being series-connected in that order;

the reservoir, ninth valve means, other strainer and third valve means being series-connected in that order.

References Cited

UNITED STATES PATENTS

| | | | |
|---|---|---|---|
| 2,979,160 | 4/1961 | Haas | 210—132 X |
| 3,397,784 | 8/1968 | Carr | 210—133 X |
| 3,425,557 | 2/1969 | Rosaen | 210—108 |

REUBEN FRIEDMAN, Primary Examiner

J. W. ADEE, Assistant Examiner

U.S. Cl. X.R.

210—132, 134, 137, 138